L. OTTINGER.
AUTOMOBILE SAFETY DEVICE.
APPLICATION FILED MAR. 19, 1909.
1,086,846.
Patented Feb. 10, 1914.
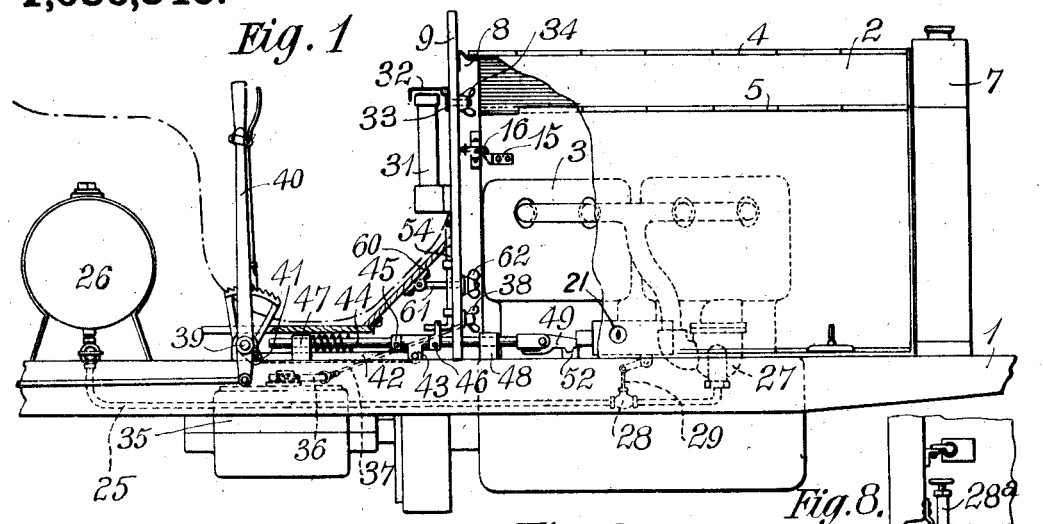
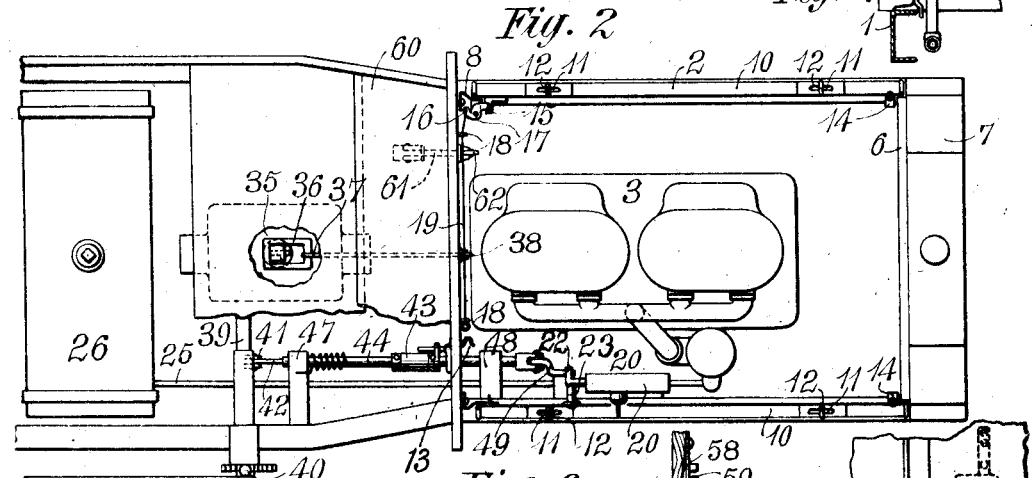
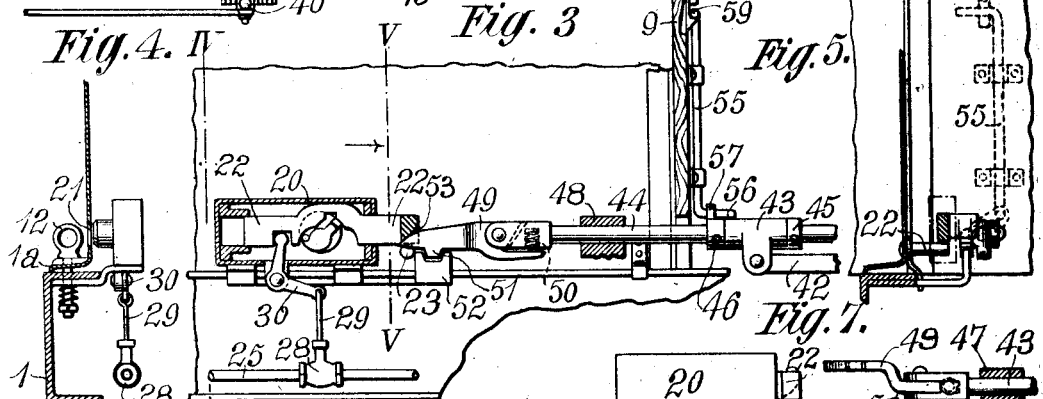
Inventor
Leon Ottinger,

UNITED STATES PATENT OFFICE.

LEON OTTINGER, OF NEW YORK, N. Y.

AUTOMOBILE SAFETY DEVICE.

1,086,846.  Specification of Letters Patent.  Patented Feb. 10, 1914.

Application filed March 19, 1909. Serial No. 484,375.

*To all whom it may concern:*

Be it known that I, LEON OTTINGER, a citizen of the United States, residing in the city, county, and State of New York, have invented new and useful Improvements in Automobile Safety Devices, of which the following is a specification.

The broad idea of the present invention is the provision of means whereby practically all the mechanism for operating a motor vehicle, or rendering it immovable, are provided with locking means actuated from a common chamber, which itself is susceptible of being locked. Of course, naturally but not essentially the bonnet or machinery housing will constitute such locking chamber.

In a prior patent granted to me October 22, 1907, No. 868,693, I have described and claimed broadly a device for preventing theft of or tampering with motor vehicles, in which reliance for such purpose is placed chiefly in locking the motor circuit in open condition so that unauthorized persons, not possessing the key or the combination of the lock, are unable to complete or close the circuit and start the motor. My present invention has the same general object in view, namely, to provide means whereby tampering with or theft of the vehicle will be prevented, but more specifically its chief object is to provide additional safeguards in connection with the controlling or driving instrumentalities, for example the brake mechanism, the fuel supply, and the gear box, so that it will be impossible not only to start or move the vehicle while the same is standing unguarded but also to tamper with the instrumentalities referred to; thus insuring that the driver, on returning to the vehicle, will find these important parts in the same condition as he left them.

A further object of the invention is to provide means of the kind mentioned which shall be simple as possible, with minimum liability of derangement or breakage, yet withal thoroughly effective for the purpose in hand.

To these and other ends the invention consists in the novel features of construction and combination of elements hereinafter described and more particularly set forth in the claims.

While the invention may be embodied in a variety of forms, I have selected for illustration and specific description herein only the embodiment which exhibits what I consider to be the most effective and convenient mode of applying the invention.

Referring now to the annexed drawing, in which the preferred embodiment of the invention is illustrated, Figure 1 is a side view of a motor vehicle with part of the hood or bonnet broken away, showing the invention applied to the vehicle. Fig. 2 is a sectional plan view. Fig. 3 is a detail view in longitudinal section showing the locking mechanism, as viewed in a direction opposite to that of Fig. 1. Fig. 4 is a detail vertical section on line IV—IV of Fig. 3. Fig. 5 is a detail section on line V—V of Fig. 3. Figs. 6 and 7 are detail side and plan views respectively, showing in different positions with respect to the lock that portion of the brake mechanism which coöperates with the lock. Fig. 8 is a detail view showing a modification of the invention as regards the valve which controls the supply of fuel to the engine of the vehicle.

The chassis of the vehicle is designated by 1, and on the forward part thereof is the usual bonnet or hood 2 inclosing the engine 3.

One of the chief features of the present invention is the secure locking of the hood or bonnet, for the purpose of preventing unauthorized access to the parts within the same, and a correct understanding of the nature of the invention, as well as the advantages possessed by it, will be better conveyed by describing first the means provided for accomplishing the purpose just mentioned.

The bonnet illustrated is of the ordinary type, having center and side hinge-joints 4 and 5. At the front the bonnet fits closely the rearward projection 6 of the radiator 7 and at the rear the bonnet fits around a forwardly projecting flange or angle-iron 8 securely fixed to the dashboard 9. The laterally extending flanges 10, at the bottom of the bonnet, are provided with longitudinally extending slots 11, through which extend spring-retracted bolts 12, the heads of said bolts being narrow enough to pass readily through the slots when the bolt-heads are turned into alinement therewith. When the bolts are in this position the bonnet can be opened in the usual manner, as will be readily understood. At the four lower corners of the bonnet are rigid fingers 14, extending down past and close to the adjacent inner edges of the chassis or parts connected thereto and serving to prevent the bonnet, made, as it usually is, of sheet metal, from being pried outwardly at the corners to afford access to the interior. At one of the rear corners is an inwardly extending finger 15, and pivoted to the angle-iron 8 adjacent thereto is a horizontally swinging latch 16, normally held over the said finger by a spring carried on the pivot 17. Extending from the rear end of the latch, through suitable guide-rings 18, is a stout operating cord 19, by which the latch may be swung out of engagement with the coöperating finger 15 on the bonnet. On the opposite side, within the bonnet and securely fixed to the chassis, is a lock 20, of any suitable construction, the key of which may be inserted through an aperture 21 in the side of the bonnet. The path of the horizontally movable lock-bolt 22 is immediately above a stud 23 extending inwardly from the bonnet, and hence that side of the bonnet cannot be raised unless the bolt is retracted. It will therefore be seen that by means of the lock 20 and the latch 16, combined with the fingers or catches 14, the bonnet is effectually secured in closed position. To gain access to the interior the lock 20 must first be actuated to retract its bolt, whereupon that side of the bonnet can be raised, after which, if t is desired to also open the other side the cord 19 is drawn toward the operator and held in open position by the hook 13 thereby withdrawing and holding the latch 16 from engagement with the finger 15. In order to put the fuel supply under control of the lock the following arrangement is provided. In the pipe 25 which connects the fuel tank 26 with the engine carbureter 27 and at a point adjacent to the lock 20 is a valve 28 of any suitable and convenient type, operated by a reciprocating stem 29. The latter is connected to the horizontal arm of a bell-crank lever 30 the vertical arm of which is engaged by the horizontally reciprocating lock-bolt 22. It will therefore be seen that when the bolt is advanced to lock the bonnet in place the bell-crank will be actuated and will depress the valve stem 29, thereby stopping the supply of gasolene or other fuel to the engine.

The usual oilers, 31, are mounted on the dashboard, and are provided with a cover or hood 32, hinged to the dashboard. This hood is formed with a depending member 33, which is provided with a bolt extending forwardly into the interior of the bonnet through a slot in the dashboard. On the inner end of this bolt is a thumb-nut 34 by which the bolt and the member 33 are drawn up to the dashboard, thereby securing the hood 32 in place over the oilers. Inasmuch as the thumb-nut is operable only from within the bonnet it will be seen that a person who is not provided with the key of the bonnet-lock cannot remove the nut and hence cannot have access to the oilers.

Instead of having the valve connected to the lock itself, so as to be operated thereby, the valve may be of an ordinary manually operated type, extending up into the bonnet from below, as indicated at 28ª, Fig. 8, so that the operating member cannot be reached except by first opening the bonnet. The gear box 35 is also secured against tampering, by locating its closure-latch operating devices under the locked bonnet. For this purpose the sliding gear-box latch 36 is provided with a rod or piece of stout wire cable 37 extending forwardly into the bonnet through a suitable slot in the dashboard. The inner end of the rod is formed with an eye through which a thumb-bolt 38 extends into engagement with the dashboard. The length of the rod 37 is such that when the eye is engaged by the thumb-bolt the latch 36 will be drawn forward into its locking position; and since the bolt cannot be removed unless access is had to the bonnet it is evident that the gear-box is effectually secured against meddling by persons not possessed of the bonnet key.

To prevent the possibility of moving the machine, to say nothing of the danger of accidents, attendant upon derangement or injury to the brake-mechanism, it is highly desirable that meddlesome and malicious persons be prevented from operating the same. For this purpose I propose to lock the said mechanism or put the same under control of the bonnet lock, so that only the proper person, provided with the key of the lock, can actuate the mechanism. With this object in view the shaft 39, to which the brake lever 40 is connected, is provided with a short forwardly and downwardly extending arm 41 pivotally connected to a horizontally reciprocating member or link 42, which is in turn pivotally connected to a sleeve 43. The latter surrounds a rod or locking member 44 which is capable of partial rotation in said sleeve but is prevented from moving longitudinally thereof by two collars 45, 46, at the ends of said sleeve. The locking rod is mounted to reciprocate in two supporting blocks 47, 48 and extends through or underneath the dashboard into the interior of the locked bonnet. On the inner end of said member is a pivoted finger 49 mounted to swing in a vertical plane but normally raised by a suitably arranged spring 50. Near its forward end the finger has a depending lug 51, adapted, when the finger is depressed against the tension of its lifting spring, to engage a corresponding formed notch in a member 52 securely connected to the chassis. The end of the finger is pointed, as shown, and is formed to enter a cam-slot 53 in the end of the lock-bolt 22. From the foregoing it will be seen that movement of the brake lever to the position shown in Fig. 1 causes the link 42 to advance the locking rod 44, thereby bringing the lug 51 directly over the coöperating block 52. Advancing the lock-bolt 22, by actuating the lock 20, then brings the cam-notch 53 into engagement with the pointed end of the finger and depresses the latter, thereby carrying the lug 51 into the notch below. Inasmuch as the last mentioned notch holds the finger securely against backward or forward movement and since so long as the lock-bolt 22 is in its advanced position the finger cannot be elevated by its spring, to carry the lug out of engagement with the block 52, it is clear that the locking rod 44, the brake-lever 40, and the associated parts (in short, the brake mechanism) cannot be operated except by a person provided with the key of the lock and thus enabled to retract the bolt thereof.

As there should be no possibility of the brake mechanism becoming locked when the car is in motion, provision is made whereby the locking finger 49 can be thrown out of its normal path, so as to escape engagement with the lock-bolt. For this purpose the finger is offset with respect to the axis of the locking rod 44, as shown in Fig. 2. Partial rotation of the latter rod, in the counter-clockwise direction as viewed from the left of the figure just named, will therefore cause the finger to assume the position shown in Fig. 7 so as to clear the bolt 21 even when the latter is advanced. This rotary adjustment of the locking rod and finger is normally prevented, however, by a latch device 55, mounted on the dashboard and adapted to slide vertically in its supports, but incapable of rotary movement. At the lower end the latch is provided with a rearwardly and horizontally extending stem 56, to loosely engage a perforated lug 57 on the collar 46, which, it will be remembered is carried by the locking rod 44. It will now be plain that when the latch 55 is in its upper position, as in Fig. 3, the stem 56 will prevent rotation of the locking rod; and hold the lug 51 above the block 52. The latch is normally held in the position mentioned by a spring device 58, engaging a laterally extending pin 59 on the upper end of the latch. The latter is released from the spring device by pressing the same inwardly, whereupon the latch may be depressed and the stem 56 carried downward causing rotation of the rod 44 so that the locking finger is turned 90° to the position shown in Fig. 7.

A portion of the floor such as the foot-board, indicated by 60, is usually removable, to afford access to the parts below the same for the purpose of inspection, repair, etc., but as this would permit tampering with such parts, I provide fastening means which can be operated only from the interior of the bonnet. For this purpose the foot-board is provided with fastening bolts 61, pivoted thereto and extending forwardly through the dashboard into the bonnet, where they are engaged by thumb-nuts 62. The latter serve to draw the foot-board down into place, and since the said nuts are inclosed by the bonnet it is evident that the foot-board is securely locked against unauthorized removal.

From the foregoing description it will be seen that my invention affords simple yet thoroughly effective means for protecting important parts of the motor vehicle against tampering, thereby insuring that such parts will always be found in proper operative condition when the driver returns to the car, and practically eliminating the possibility of the car being stolen.

While I have described herein only one specific form of the invention it will be evident to those skilled in the art that the invention is capable of being embodied in a variety of other forms without departure from its proper spirit and scope as defined by the appended claims.

What I claim is:

1. In a motor vehicle, a chamber, a movable closure therefor, a lock for said closure, motor controlling mechanism, braking mechanism, parts extending from said mechanisms and terminating within said chamber, and means for locking said parts in fixed positions therein.

2. In a motor vehicle, the combination with the bonnet, motor controlling mechanism and braking mechanism, parts extending from said mechanism and terminating within the said bonnet, means for rigidly securing the inner ends of said parts within said bonnet, and a key-operated lock for said bonnet by which the securing means are rendered inaccessible.

3. In a motor vehicle, the combination with the bonnet, motor controlling mechanism and braking mechanism, parts extending from said mechanisms and terminating within said bonnet, means for covering said parts exterior to said bonnet, a securing device for said covering operable only from within said bonnet, means for rigidly securing the inner ends of said parts within said bonnet, and a key-operated lock for said bonnet.

4. In a motor vehicle, a removable floor-board, of fastening means for said floor-board extending into and operable from within an inclosed space or chamber, a closure for the latter, and a lock for securing said closure in position.

5. In a motor vehicle, the combination with the bonnet, and lock mechanism for securing the bonnet in closed position, brake mechanism, a member connected with the brake mechanism and movable therewith, extending into the bonnet and means operated by said lock mechanism for locking said member rigidly in position whereby the brake mechanism may be locked against unauthorized operation.

6. In a motor vehicle, the combination with the brake mechanism, of a member movable therewith and extending into the bonnet of the vehicle, a rigid member inside the bonnet, adapted to be detachably engaged by the first mentioned member to prevent actuation of the brake mechanism, and a lock inclosed by the bonnet and constructed to hold the said members in engagement with each other.

7. In a motor vehicle, the combination with the brake mechanism and the operating lever thereof, of a reciprocating member connected to said lever so as to be moved thereby when the same is actuated to operate the brake mechanism, a lock engaging said member, and means for rendering said lock inoperative as to said member and controllable independently of the operation of the lock.

8. In a motor vehicle, the combination with the brake mechanism, and the operating lever thereof, of a reciprocating member extending into the bonnet and connected to said lever so as to be moved thereby when the same is actuated to operate the brake mechanism, a lock engaging said member and also adapted to lock said bonnet, and independent means located within said bonnet for rendering said lock inoperative as to said member.

9. In a motor vehicle, the combination with the bonnet, motor controlling mechanism, braking mechanism, and transmission mechanism, parts extending from said mechanisms and terminating within said bonnet, means for covering said parts exterior to the bonnet, securing devices for said coverings operable only from within said bonnet, means for rigidly securing the inner ends of said parts within said bonnet, and a key-operated lock for said bonnet.

10. In a motor vehicle, the combination with the bonnet, and a plurality of accessories for the power mechanism located outside of said bonnet, parts for securing said accessories in predetermined positions and terminating within said bonnet, and removable coverings for said parts, exterior to said bonnet, securing devices for said coverings extending into and operable only within said bonnet, and a key-operated lock for said bonnet.

11. In a motor vehicle, the combination with the bonnet mounted on the chassis of the vehicle, of devices at the edges of the bonnet engaging the adjacent portions of the chassis to prevent outward distortion of the bonnet at such points, latch mechanism at one side of the bonnet and inclosed thereby, for securing the bonnet in place and a lock at the other side of the bonnet, secured to the chassis, and means carried by the adjacent side of the bonnet for engagement with the bolt of said lock to detachably connect the adjacent side of the bonnet to the chassis.

In witness whereof, I have signed my name in the presence of two witnesses.

LEON OTTINGER.

Witnesses:
J. EDWARD GEORGE,
H. RICHARD WOBSE.